UNITED STATES PATENT OFFICE.

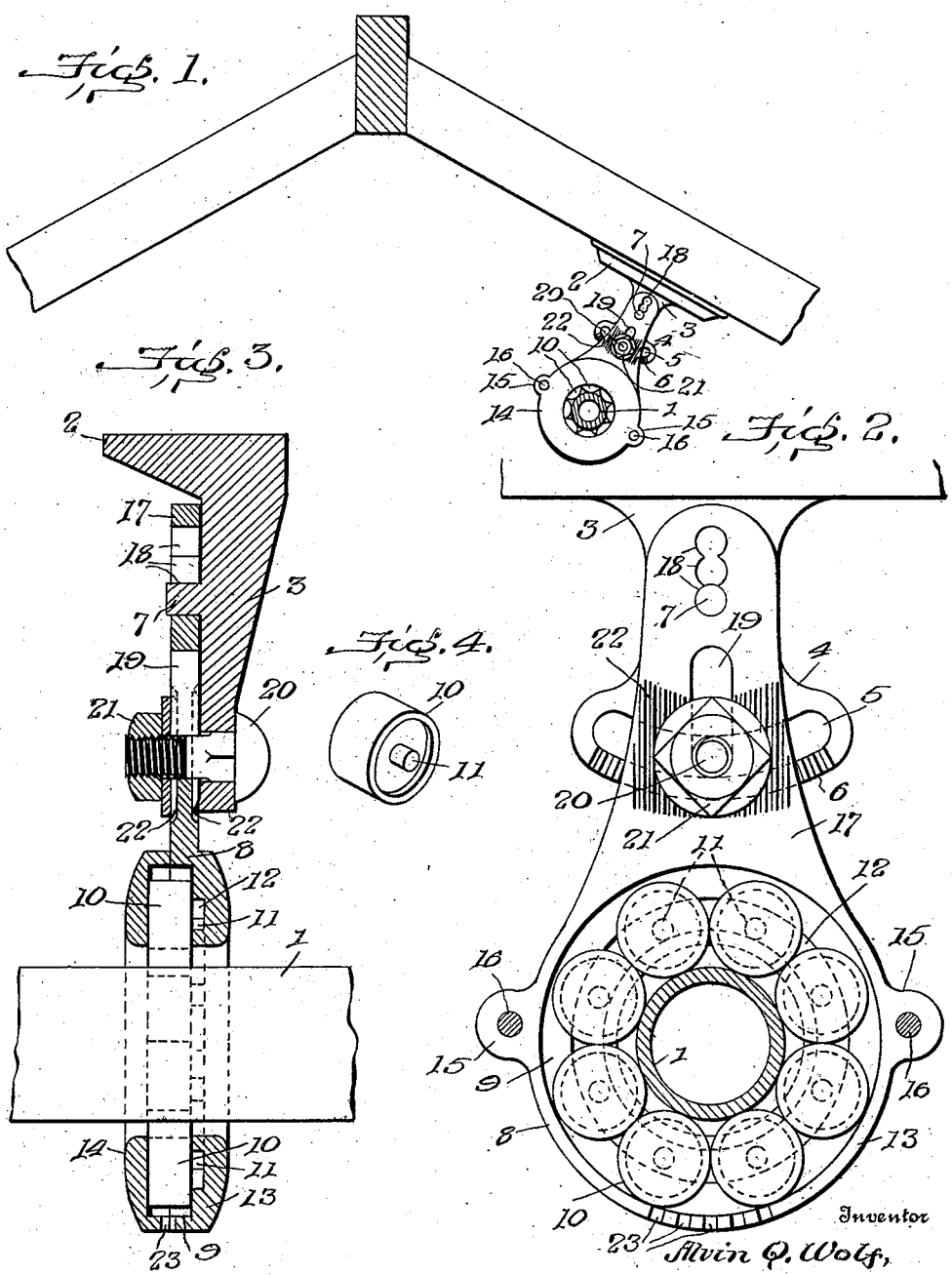

ALVIN Q. WOLF, OF DAYTON, OHIO, ASSIGNOR TO THE WOLF MACHINE COMPANY, OF DAYTON, OHIO, A CORPORATION OF OHIO.

SHAFT-HANGER.

No. 915,645.  Specification of Letters Patent.  Patented March 16, 1909.

Original application filed November 6, 1906, Serial No. 342,255. Divided and this application filed February 11, 1907. Serial No. 356,670.

*To all whom it may concern:*

Be it known that I, ALVIN Q. WOLF, a citizen of the United States, residing at Dayton, in the county of Montgomery and State of Ohio, have invented certain new and useful Improvements in Shaft-Hangers, of which the following is a specification, reference being had therein to the accompanying drawings.

The present invention relates to shaft hangers, and more particularly to hangers adapted for use with the light shafts used in connection with the operating mechanism for ventilators, such, for instance, as the mechanism described in my pending application for operating mechanism for ventilators, filed Nov. 6, 1906, Ser. No. 342,255, of which application the present application is a division.

The object of the invention is to provide a shaft hanger of this character which can be readily adjusted to any one of a variety of positions; which will support the shaft and allow the same to rotate therein with a minimum of friction; and which will readily free itself from any accumulations of dust or dirt which may enter the casing thereof.

With these objects in view my invention consists of certain novel features of construction to be hereinafter described, and then more fully pointed out in the claims.

In the accompanying drawings, Figure 1 is a front elevation of the shaft hanger attached to a rafter; Fig. 2 is an enlarged view of the same, with the front portion removed; Fig. 3 is a vertical section of the same taken longitudinally of the shaft; and Fig. 4 is a detail view of one of the antifriction rollers.

In these drawings I have illustrated the preferred form of my invention, in which the shaft 1 is shown as mounted in the hanger which comprises a bracket 2, secured to the rafter or other suitable stationary support, and provided with a downwardly extending arm 3 having an enlarged lower portion 4 provided with a curved slot 5 conforming to the arc of a circle. That portion of the arm 3 which lies between the slot 5 and the lower extremity of the arm is provided with suitable teeth or serrations 6. Intermediate its ends the arm 3 of the bracket 2 is provided with a lug or projection 7. The bearing portion of the hanger is adjustably mounted on the bracket thereof and comprises an annular shell or bearing ring 8, provided with an annular groove 9 in which are mounted antifriction rollers 10 of a diameter slightly greater than the radial depth of the groove 9, whereby, when the shaft 1 is inserted in the hanger, the antifriction rollers 10 will substantially fill the space between the surface of the shaft and the bearing surface at the base of the annular groove 9. The antifriction rollers 10 are provided on one side thereof with a pintle or lug 11 adapted to engage with the annular groove 12 formed in one side of the bearing and extending at right angles to the radial depth of the groove 9 and serving as a guide for the antifriction rollers. The pintles 11 are preferably of a diameter less than the width of the groove 12, thus allowing the antifriction rollers a slight radial movement but effectually preventing their displacement. For convenience in manufacture, this bearing ring is preferably formed in two parts, the main or rear portion 13, which contains the groove 9, and the front portion or cover 14, each portion containing a part of the annular groove 9 and being provided with ears 15, whereby the two parts of the bearing are connected by means of bolts or rivets 16. The bearing ring is provided with an arm 17 having at its upper end a series of apertures 18 adapted to receive the lug 7, and, at a point intermediate the apertures 18 and the bearing ring is provided with an elongated slot 19 adapted to receive a bolt 20, extending through the slot 5 in the arm 3 and provided with a nut 21. The opposite faces of the arm 17 are provided with teeth or serrations 22 adapted to engage with the serrations 6 on the arm 3 and with the washer or nut on the opposite side of the arm 17 to hold the same firmly in position and prevent any slipping or movement thereof. This construction of the hanger renders the same readily adjustable through a considerable range of movement and adapts the same for use in a variety of positions. The annular groove 9 in the bearing ring 8 is provided near its lowermost portion with a series of apertures 23 extending along the circumference thereof and adapted to permit any dust or dirt, which may accumulate in the bearing ring, to escape, the same being worked through these apertures by the movement of the antifriction rollers 10 within the groove 9. The apertures 23 may be formed either entirely in one member of the bearing ring, or, as is preferable, they may be formed in the adjoining edges of the two members.

From the foregoing description it will be apparent that I have provided a shaft hanger which can be readily adjusted to any one of a variety of positions by shifting the arm 17 so that the lug 7 of the arm 3 will engage the desired aperture 18 in the arm 17, then moving the arm 17 about the lug 7 as a pivotal center and tightening the bolt 21 on the nut 20 to lock the arm 17 in its desired position along the segmental slot 5 of the enlarged portion 4 of the arm 3. Further, it will be observed that I have provided this adjustable hanger with a bearing shell or ring, in which the antifriction rollers are so mounted that they have free movement therein, both circumferentially thereof and to a limited extent radially thereof, thus avoiding any friction in their movement, and are provided with adequate means for preventing their displacement or accidental removal from the casing. Further, that I have provided means for maintaining the casing free from dust or dirt which is very apt to accumulate therein when the hanger is used in connection with ventilators in shops and similar places where there is a great deal of dust, and which, when it accumulates within the casing, seriously interferes with the operation of the antifriction rollers.

I wish it to be understood that I do not desire to be limited to the exact details of construction, shown and described, for obvious modifications will occur to a person skilled in the art.

Having thus fully described my invention, what I claim as new and desire to secure by Letters Patent, is:—

1. In a shaft hanger, the combination, with an annular shell adapted to receive a shaft, having an arm provided with a series of longitudinally arranged apertures near the outer end thereof and having a slot extending longitudinally thereof intermediate said apertures and said shell, and antifriction rollers mounted within said shell, of a bracket adapted to be secured to a fixed support and provided with an arm having a curved slot in the lower portion thereof and having a fixed lug above said slot adapted to engage any one of the apertures in the first-mentioned arm, a bolt extending through said curved slot in the last-mentioned arm and said longitudinal slot in the first-mentioned arm, and a nut carried by said bolt and adapted to lock said parts in their adjusted position.

2. In a shaft hanger, the combination, with a vertically divided two part annular casing, the adjacent faces of said parts having corresponding annular recesses therein adapted to form a radial groove in said casing, one of said parts having an annular recess extending at substantially right angles to said radial groove, apertured lugs carried by each part of said casing, bolts for connecting said lugs, antifriction rollers mounted in said radial groove, and pintles carried by said rollers and engaging said last-mentioned annular recess, one part of said casing having an arm provided with a series of apertures near the outer end thereof and having a slot extending longitudinally thereof between said apertures and said casing, of a bracket adapted to be secured to a fixed support and provided with an arm having a curved slot in the lower portion thereof and having a fixed lug above said slot adapted to engage any one of the apertures in the first-mentioned arm, a bolt extending through said curved slot in the last-mentioned arm and said longitudinal slot in the first-mentioned arm, and means carried by said bolt for locking said parts in their adjusted positions.

In testimony whereof, I affix my signature in presence of two witnesses.

ALVIN Q. WOLF.

Witnesses:
WILLIAM H. CARVER,
JAMES A. MUMMA.